(No Model.)
W. H. H. HEYDRICK.
MOWING AND REAPING MACHINE.
No. 386,318. Patented July 17, 1888.
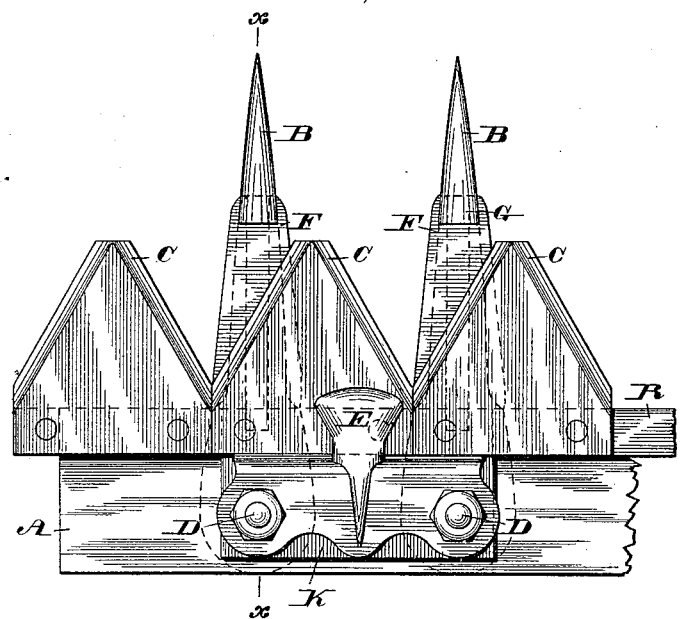
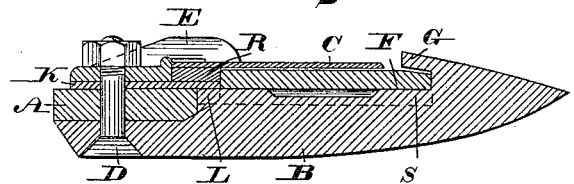
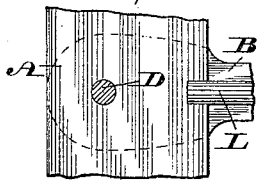 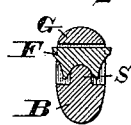 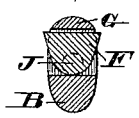
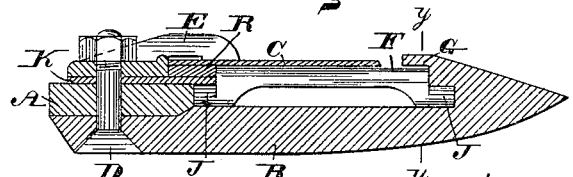
WITNESSES:
Th. Rollé.
A. P. Jennings.
INVENTOR:
Wm H. H. Heydrick
BY Diederscheimer Kintner
ATTORNEYS.

UNITED STATES PATENT OFFICE.

WILLIAM H. H. HEYDRICK, OF PHILADELPHIA, PENNSYLVANIA.

MOWING AND REAPING MACHINE.

SPECIFICATION forming part of Letters Patent No. 386,318, dated July 17, 1888.

Application filed September 26, 1887. Serial No. 250,668. (No model.)

*To all whom it may concern:*

Be it known that I, WILLIAM H. H. HEYDRICK, a citizen of the United States, residing in the city and county of Philadelphia, State of Pennsylvania, have invented a new and useful Improvement in Mowing and Reaping Machines, which improvement is fully set forth in the following specification and accompanying drawings.

My invention relates to improvements in mowing and reaping machines; and it consists of the combination and arrangement of parts, as hereinafter set forth and claimed, whereby, owing to the rocking of the ledger-plates, which is caused by the motion of the cutter, the side of the ledger-plate which meets the cutting-edge of the cutter or knife is tilted upward, so as to be in contact with the same, thereby imparting a shearing action to the cutter, and at the same time preventing the gathering of the wet dead grass between the ledger-plates and the cutter-bar. It will be better understood by referring to the accompanying drawings, in which—

Figure 1 represents a plan view of a portion of a mower cutter-bar and finger-bar and connections with my improvement attached. Fig. 2 represents a cross-section of Fig. 1 on line $xx$. Figs. 3 and 4 are detail views showing the bearings and interior parts. Fig. 5 represents a vertical section, similar to Fig. 2, of a modified form of my invention. Fig. 6 represents a cross-section of Fig. 5 on line $yy$.

Similar letters of reference indicate corresponding parts in the several figures.

Referring to the drawings, A is the finger-bar of usual construction; B, the guard-fingers held firmly to said finger-bar by bolts D, which in the present case also act to hold the keeper E in place.

C represents the cutters of usual construction, and F the rocking ledger-plates, each having a flat upper surface with a grooved channel in its lower face adapted to bear on its rounded shoulders S and L on the front and rear ends of the fingers B, as clearly shown in Figs. 2, 3, and 4.

The parts described so far are old and of the usual construction, except that the shoulder L extends back into a notch in the finger-bar A, so as to give a firm bearing for the finger B and necessitate only one bolt D to each finger. The rear end of the rocking ledger-plate projects above the level of the finger-bar about a quarter of an inch, and forms a shoulder against which the cutter-bar R abuts. By this construction the dead grass is prevented from entering between the ledger-plates and cutter-bar, and consequently the clogging of the same is avoided.

The operation is obvious. Nothing need be said of it here, other than to say that the peculiar rocking motion is the same as in similar devices heretofore patented.

In Figs. 5 and 6 I have shown a modified form in which the ends of the rocking ledger-plate are in the nature of journals having bearings, one in the finger-bar and the other in a hole in the finger at its forward end. The rocking ledger-plate is slipped into position before the cutter-bar is inserted, and may be held in place, if desired, by permanently-fixed plates K over each finger; or said plates may be entirely removed, if desired, and the cutter-bar slide directly upon the journaled ends J. I also find it desirable to remove the upper or extended guard which is usually found on mower and reaper fingers, and have only the short projection or guard G for the rocking ledger-plate, as clearly shown. By the removal of these projections or guards I give the cutters full play and allow them to spring up unharmed when they come into contact with sticks or stones. I find such a finger decidedly preferable to the old form.

Having thus described my invention, what I claim as new, and desire to secure by Letters Patent, is—

The guard-finger B, with front projection, G, and having the shoulders L and S thereon, in combination with the finger-bar A, the rear end of said shoulder L projecting into a notch in the forward edge of said bar, the rocking ledger-plate F, having a grooved channel in its under face, and its rear end projecting above the plane of the finger-bar, and the cutter-bar R, with cutter C, the said cutter-bar abutting against the rear end of the rocking ledger-plate, substantially as and for the purpose set forth.

W. H. H. HEYDRICK.

Witnesses:
JOHN A. WIEDERSHEIM,
JAMES F. KELLY.